United States Patent
Ito

(10) Patent No.: US 12,424,118 B2
(45) Date of Patent: Sep. 23, 2025

(54) INFORMATION PROCESSING DEVICE, STORAGE MEDIUM, AND INFORMATION PROCESSING SYSTEM

(71) Applicant: CASIO COMPUTER CO., LTD., Tokyo (JP)

(72) Inventor: Masahiro Ito, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 8 days.

(21) Appl. No.: 18/538,204

(22) Filed: Dec. 13, 2023

(65) Prior Publication Data

US 2024/0221522 A1 Jul. 4, 2024

(30) Foreign Application Priority Data

Jan. 4, 2023 (JP) ................................ 2023-000130

(51) Int. Cl.
*G09B 5/14* (2006.01)
*G09B 5/02* (2006.01)

(52) U.S. Cl.
CPC ........ *G09B 5/14* (2013.01); *G09B 5/02* (2013.01)

(58) Field of Classification Search
CPC ............... G09B 5/14; G09B 5/02; G09B 7/02
See application file for complete search history.

(56) References Cited

U.S. PATENT DOCUMENTS

| 6,690,913 | B2 | 2/2004 | Makishima et al. |
| 2002/0110796 | A1 | 8/2002 | Sugano et al. |
| 2002/0192631 | A1* | 12/2002 | Weir ............... G09B 7/07 434/350 |
| 2009/0083710 | A1* | 3/2009 | Best ............... G09B 7/02 717/120 |

(Continued)

FOREIGN PATENT DOCUMENTS

| JP | 2002006730 A | 1/2002 |
| JP | 2014127033 A | 7/2014 |

(Continued)

OTHER PUBLICATIONS

Extended European Search Report (EESR) dated Apr. 15, 2024, issued in counterpart European Application No. 24150246.7.

(Continued)

*Primary Examiner* — Eddy Saint-Vil

(74) *Attorney, Agent, or Firm* — Holtz, Holtz & Volek PC

(57) ABSTRACT

An information processing device is communicably connected to a first terminal device used by a provider and a second terminal device used by a recipient and includes a processor. The processor acquires acquired information indicating that an acquirer of information data has already acquired the information data via the second terminal device. The acquirer is out of the recipient and is designated by the first terminal device. The processor provides acquisition status information by associating a number of the acquirer, a number of the recipient having acquired the information data or not having acquired the information (Continued)

data, and a thumbnail image of the information data based on the acquired information. The processor causes a display of the first terminal device to display the acquisition status information.

12 Claims, 10 Drawing Sheets

(56) References Cited

U.S. PATENT DOCUMENTS

| | | | |
|---|---|---|---|
| 2014/0272895 A1* | 9/2014 | Feistritzer | G06Q 10/06311 |
| | | | 434/350 |
| 2014/0340408 A1* | 11/2014 | Mayumi | G09B 7/02 |
| | | | 345/467 |
| 2015/0017625 A1* | 1/2015 | Yoo | G09B 5/02 |
| | | | 434/350 |
| 2015/0103154 A1* | 4/2015 | Candelore | G09B 21/008 |
| | | | 348/63 |
| 2015/0310756 A1 | 10/2015 | Nakamura et al. | |
| 2018/0286265 A1* | 10/2018 | Matsumoto | G06Q 50/01 |
| 2022/0012638 A1* | 1/2022 | Loh | G06F 16/2228 |
| 2023/0066506 A1* | 3/2023 | Casas | G06F 16/93 |

FOREIGN PATENT DOCUMENTS

| | | |
|---|---|---|
| WO | 2019136333 A1 | 7/2019 |
| WO | 2019241527 A1 | 12/2019 |

OTHER PUBLICATIONS

European Office Action dated Apr. 23, 2025, issued in counterpart European Application No. 24150246.7.

* cited by examiner

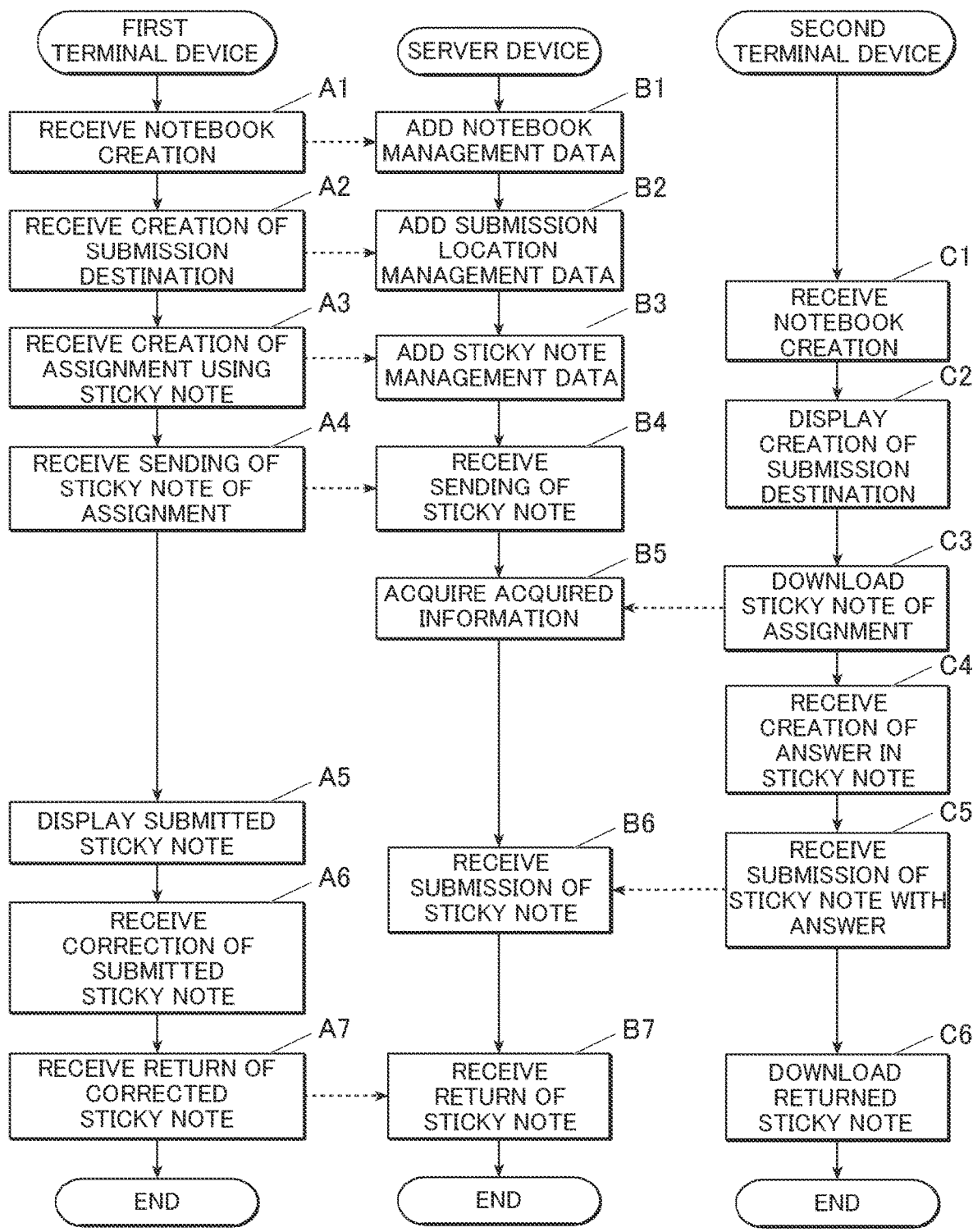

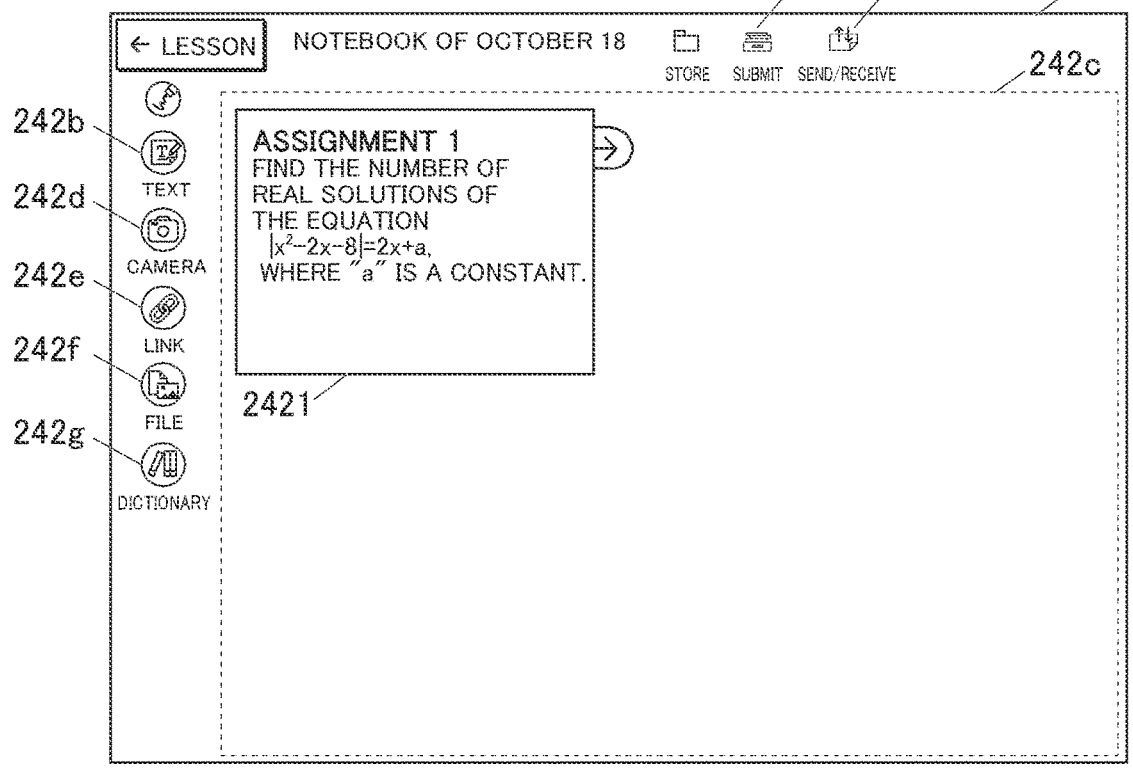
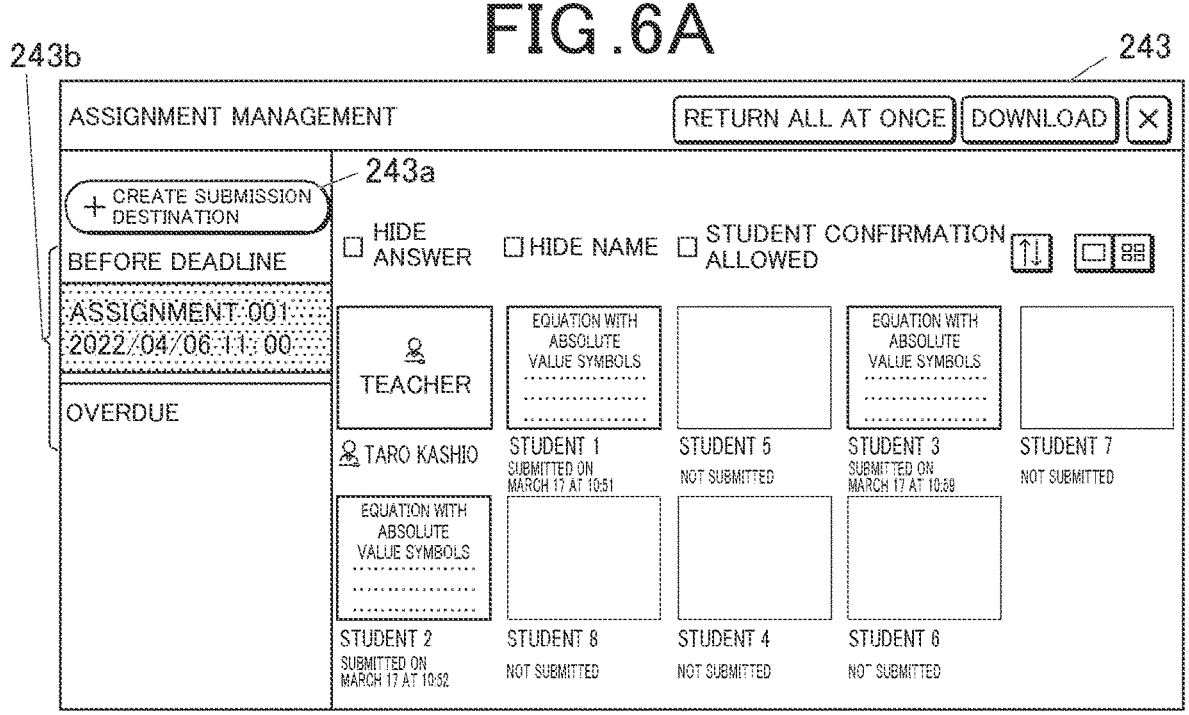

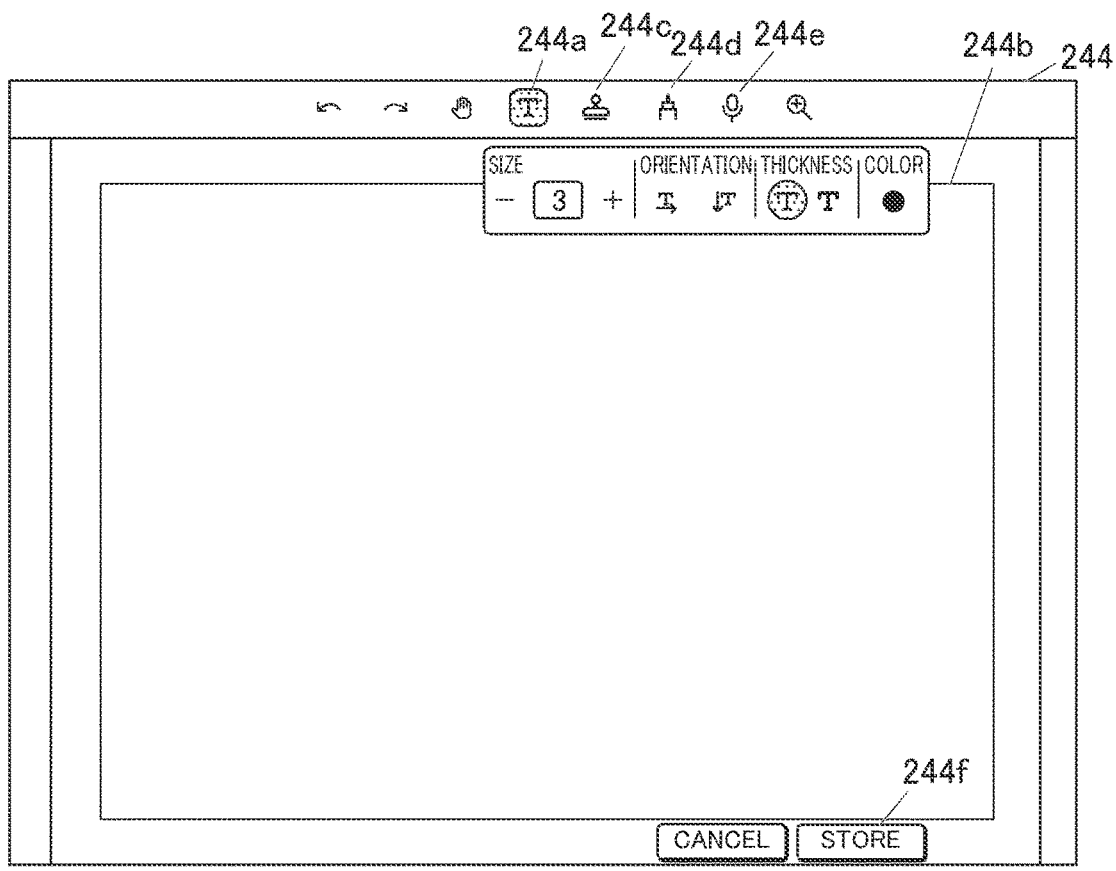

INFORMATION PROCESSING DEVICE, STORAGE MEDIUM, AND INFORMATION PROCESSING SYSTEM

REFERENCE TO RELATED APPLICATIONS

This application is based upon and claims the benefit of priority from the prior Japanese Patent Application No. 2023-000130 filed on Jan. 4, 2023, the entire contents of which are incorporated herein by reference.

TECHNICAL FIELD

This disclosure relates to an information processing device, a storage medium, and an information processing system.

DESCRIPTION OF RELATED ART

Conventionally, there is known a learning support system that uses computer network systems to share various types of information such as an assignment to be corrected between teacher (s) and student (s).

Specifically, for example, JP 2002-006730 A describes a learning support system related to a selection process of teaching materials, a sending process of assignment data to be corrected, a receiving process of answer data, a correcting process, a registration process of the corrected data, and a sending process of the corrected data.

SUMMARY OF THE INVENTION

The information processing device of the present disclosure is communicably connected to a first terminal device used by a provider and a second terminal device used by a recipient, and includes a processor that
 acquires acquired information indicating that an acquirer of information data has already acquired the information data via the second terminal device, the acquirer being out of the recipient and being designated by the first terminal device,
 provides acquisition status information by associating a number of the acquirer, a number of the recipient having acquired the information data or not having acquired the information data, and a thumbnail image of the information data based on the acquired information, and
 causes a display of the first terminal device to display the acquisition status information.

BRIEF DESCRIPTION OF DRAWINGS

The accompanying drawings are not intended as a definition of the limits of the invention but illustrate embodiments of the invention, and together with the general description given above and the detailed description of the embodiments given below, serve to explain the principles of the invention, wherein:

FIG. 3 is a flowchart illustrating an example of usage of the lesson support function according to the first embodiment;

FIG. 5B is a diagram illustrating an example of a notebook screen according to the first embodiment;

FIG. 6A is a diagram illustrating an example of an assignment management screen according to the first embodiment;

FIG. 6B is a diagram illustrating an example of a new submission destination creation screen according to the first embodiment;

FIG. 7 is a diagram illustrating an example of a sticky note edit screen according to the first embodiment;

DETAILED DESCRIPTION

Hereinafter, information processing system according to embodiments of the present disclosure will be described in detail with reference to the attached drawings. Various technically preferred limitations are included in the embodiments described below in order to implement the present disclosure, but the scope of the present disclosure is not limited to the following embodiments and illustrated examples.

In the present embodiments, the information processing system is to be used by a teacher (s) (educator, provider) and student (s) (learner (s), recipient (s)) during lesson at school. The term "school" includes not only a regular elementary school, a junior high school, a high school, and a university, but also a vocational school, a cram school, and a prep school.

First Embodiment

[1. Description of Configuration]
[1-1. Description of Configuration of Information Processing System 1]

Figure 1:
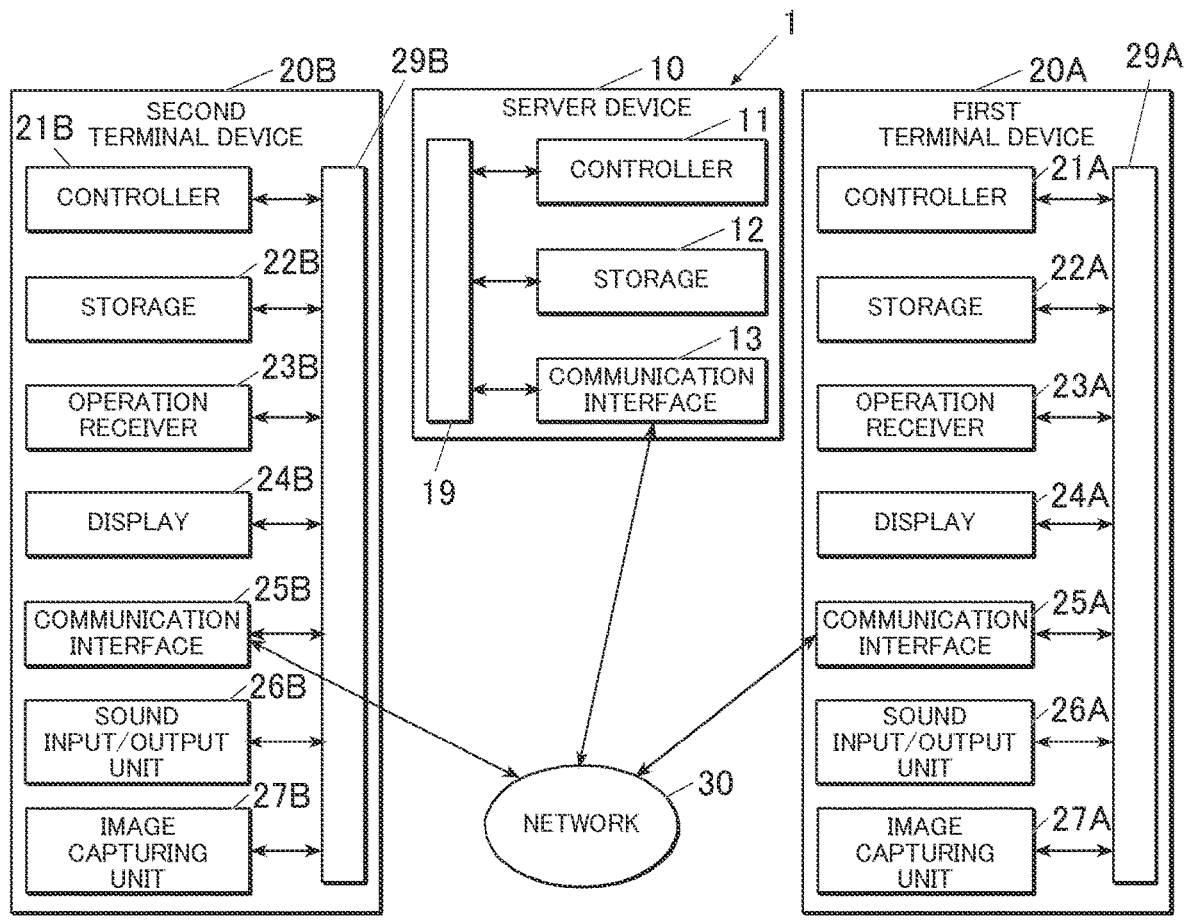
FIG. 1 is a connection diagram illustrating a schematic configuration of an information processing system according to a first embodiment.

FIG. 1 illustrates a configuration example of an information processing system 1 according to the first embodiment of the present disclosure. The information processing system 1 includes a server device 10, which is an information processing device, a first terminal device 20A, and (multiple) second terminal device (s) 20B. The information processing system 1 may include multiple first terminal devices 20A. The server device 10, the first terminal device 20A, and the second terminal devices 20B are connected to each other via a network 30 to enable electrical communications.

The network 30 may be any electrical communication network, for example, the internet, a wireless LAN (Local Area Network), a wired LAN, a mobile communications network, a short-distance wireless communications network, or a combination of some or all of them.

[1-2. Description of Configuration of Server Device 10]

The server device 10 includes a controller 11, a storage 12, and a communication interface 13. These components are connected to each other via a system bus 19.

The controller 11 includes at least one CPU (Central Processing Unit), a RAM (Random Access Memory), and the like, and controls each part of the server device 10. The controller 11 includes at least one CPU (Central Processing Unit), a RAM (Random Access Memory), and the like, and controls each part of the server device 10. Specifically, the controller 11 reads a designated program out of the system program(s) and the application program(s) stored in the storage 12, loads the program in the RAM, and executes various processes in accordance with the program.

For example, according to an execution result of the application program, the controller 11 generates a control signal to cause the display 24A of the first terminal device 20A to display the execution result and sends the control signal to the first terminal device 20A via the communication interface 13. In addition, according to the execution result of the application program, the controller 11 generates a control signal to cause the displays 24B of the second terminal devices 20B to display the execution result and sends the control signal to the second terminal devices 20B via the communication interface 13.

The storage 12 includes, for example, an HDD (Hard Disk Drive), an SSD (Solid State Drive), an EEPROM (Electrically Erasable Programmable Read Only Memory), and the like. The storage 12 stores system programs and application programs executed by the controller 11 and other data necessary for execution of these programs.

The communication interface 13 includes an NIC (Network Interface Card) and the like, and accesses the network 30 to perform electrical communications with external devices.

[1-3. Description of Configuration of First Terminal Device 20A]

The first terminal device 20A is the terminal device used by the teacher (first user). The first terminal device 20A may be a personal computer, a portable terminal device such as a tablet, or a mobile communication device such as a smart phone.

The first terminal device 20A includes a controller 21A, a storage 22A, an operation receiver 23A, a display 24A, a communication interface 25A, a sound input/output unit 26A, an image capturing unit 27A, and the like. These components are connected to each other via a system bus 29A.

The controller 21A includes at least one CPU, a RAM, and the like, and controls each part of the first terminal device 20A. Specifically, the controller 21A reads a designated program out of system program (s) and application program(s) stored in the storage 22A, loads the program in the RAM, and executes various processes in accordance with the program.

For example, the controller 21A executes a learning support application program for teacher (s) to cause the communication interface 25A to send information based on the content of the user's input operation to the operation receiver 23A to the server device 10, to cause the display 24A to display the information received from the server device 10, and the like.

The storage 22A includes, for example, an HDD, an SSD, an EEPROM, and the like.

The storage 22A stores the system programs and the learning support application programs for teachers executed by the controller 21A, and other data necessary for execution of these programs. The programs may be downloaded to the storage 22A from an external web server via the network 30 and the communication interface 25A.

The operation receiver 23A includes an operation input unit such as a keyboard, a touch panel, a mouse, and the like. The operation receiver 23A receives an input operation by the user and outputs information on the operation to the controller 21A.

The display 24A consists of an LCD (Liquid Crystal Display), an EL (Electro Luminescence) display, or the like, and displays various information according to the display information from the controller 21A.

The communication interface 25A includes at least one of a wired communication module and a wireless communication module such as an NIC, accesses the network 30, and performs electrical communication with external devices.

The sound input/output unit 26A includes a sound input unit such as a microphone and a sound output unit such as an amplifier and a speaker. The sound input/output unit 26A acquires a sound signal such as the user's voice via the sound input unit, converts the sound signal into sound data, and outputs the sound data to the controller 21A. The sound input/output unit 26A also outputs sound via the sound output unit based on the sound data input from the controller 21A.

The image capturing unit 27A is a digital camera unit having an optical system and an imaging element such as a CCD (Charge Coupled Device) or a CMOS (Complementary Metal Oxide Semiconductor), captures a subject (for example, a user), generates image data of a still image or a moving image, and outputs the data to the controller 21A.

[1-4. Description of Configuration of Second Terminal Device 20A]

The second terminal device (s)) 20B is a terminal device (s) used by the student (s) (second user (s)). Similar to the first terminal device 20A, the second terminal device 20B may be a personal computer, a portable terminal device such as a tablet, or a mobile communication device such as a smart phone.

The second terminal device 20B has a controller 21B, a storage 22B, an operation receiver 23B, a display 24B, a communication interface 25B, a sound input/output unit 26B, an image capturing unit 27B, and the like. These components are connected to each other via a system bus 29B.

The controller 21B includes at least one CPU, a RAM, and the like, and controls each part of the second terminal device 20B. Specifically, the controller 21B reads a designated program from among the system program (s) and application program (s) stored in the storage 22B, loads the program in the RAM, and executes various processes in accordance with the program.

For example, the controller 21B executes a learning support application program for student (s) to cause the communication interface 25B to send information based on the content of the user's input operation to the operation receiver 23B to the server device 10, to cause the display 24B to display the information received from the server device 10, and the like.

The storage 22B includes, for example, an HDD, an SSD, an EEPROM, and the like.

The storage 22B stores system programs and the learning support application programs for students executed by the controller 21B, and other data necessary for execution of these programs. The programs may be downloaded to the storage 22B from an external web server via the network 30 and the communication interface 25B.

The operation receiver 23B, the display 24B, the communication interface 25B, the sound input/output unit 26B, and the image capturing unit 27B are respectively configured in the same manner as the operation receiver 23A, the display 24A, the communication interface 25A, the sound input/output unit 26A, and the image capturing unit 27A. Therefore, explanations of them are omitted.

[1-5. Description of Configuration of Database]

Figure 2:
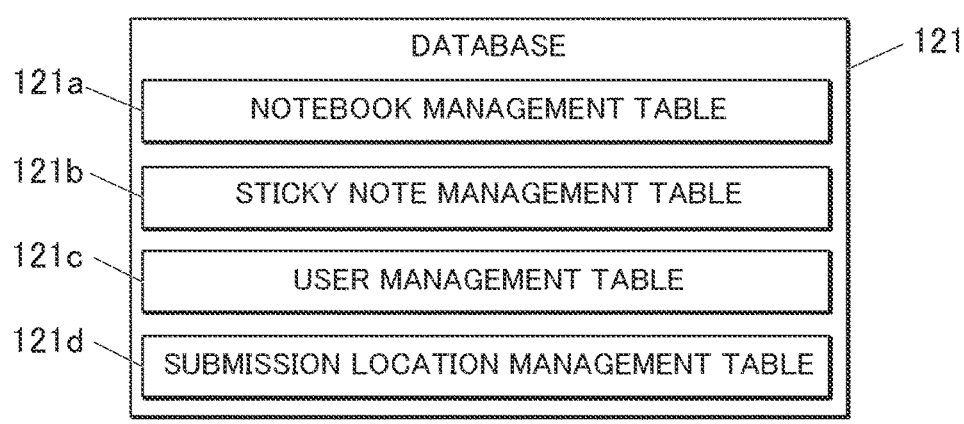
FIG. 2 is a diagram illustrating an example of the configuration of a database according to the first embodiment.

FIG. 2 illustrates an example of the configuration of a database 121. The database 121 is provided in the storage 12 of the server device 10. The database 121 includes a notebook management table 121a, a sticky note management table 121b, a user management table 121c, and a submission location management table 121d.

Figure 5A:
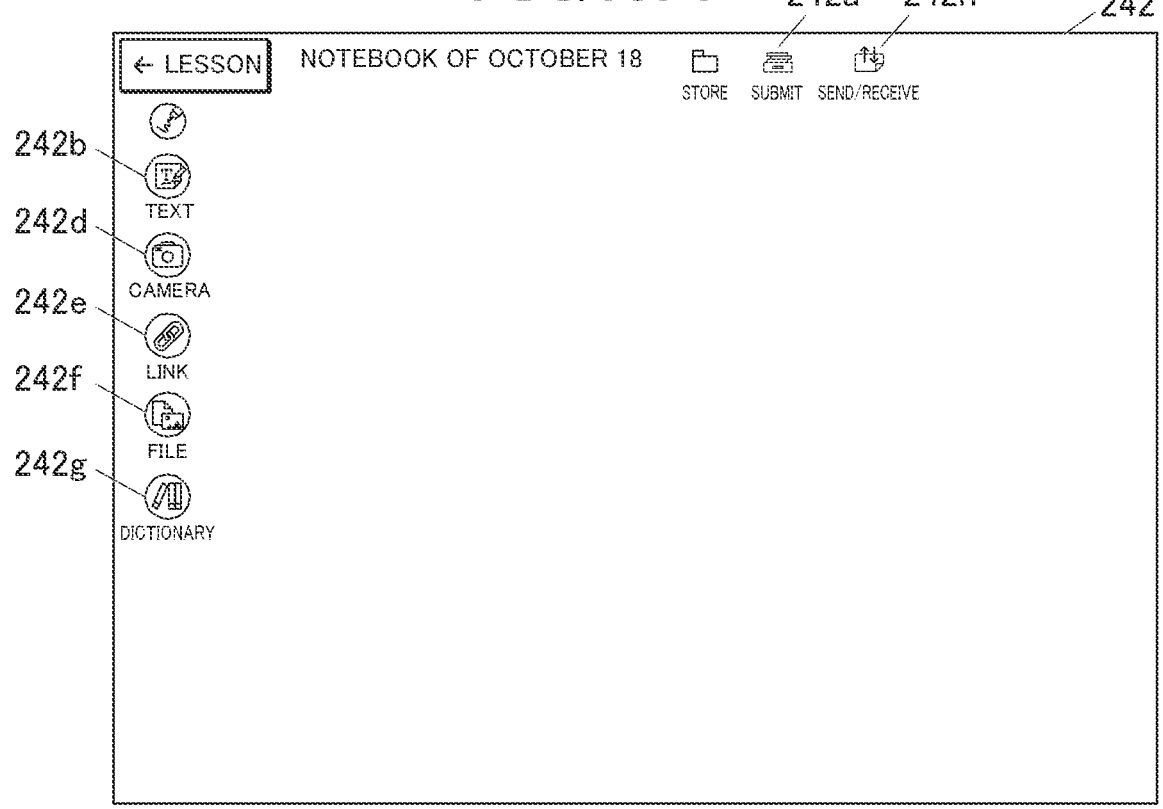
FIG. 5A is a diagram illustrating an example of a notebook screen according to the first embodiment.

The notebook management table 121a is a table for management of information related to a notebook created by the user in the learning support application (learning support application for teachers or learning support application for students). FIG. 5B illustrates an example of a notebook screen 242 that displays the notebook.

In the notebook management table 121a, information such as a data ID, a notebook ID, a user ID, and a notebook thumbnail image is stored for each notebook created by the user. The data indicating the information stored in the notebook management table 121a are also referred to as notebook management data. When a new notebook is created, a new line of notebook management data is added to the notebook management table 121a.

The data ID is unique identification information assigned to each notebook management data. The user ID is identification information of the user who has created the notebook. The notebook ID is identification information assigned to each notebook.

The notebook thumbnail image includes image data indicating a thumbnail image of the notebook. For example, the notebook thumbnail image is created using a captured image data of the notebook screen.

The sticky note management table 121b is a table for management of information related to a sticky note created by the user in the learning support application. FIG. 5B shows an example of a sticky note 2421 displayed in the notebook screen 242.

In the sticky note management table 121b, information of a sticky note ID, a notebook ID, a sticky note type, a sticky note content, and a sticky note thumbnail image is stored for each sticky note created by the user. The data indicating the information stored in the sticky note management table 121b are also referred to as sticky note management data. When a new sticky note is created, a new line of sticky note management data is added to the sticky note management table 121b.

The sticky note ID is unique identification information assigned to the sticky note management data corresponding to each sticky note. The notebook ID corresponds to the notebook ID in the notebook management data stored in the notebook management table 121a and is identification information of the notebook in which each sticky note is displayed.

The sticky note type is information that indicates the type of the sticky note, such as text sticky note, camera sticky note, link sticky note, file sticky note, dictionary sticky note, and the like. Each sticky note type will be detailed below.

The sticky note content indicates the content of the sticky note, and is information that identifiably indicates a text string, an image, a moving image, and the like. The sticky note content may also include information about display settings, such as a display position, a display size, and a display color, for each sticky note in the notebook. The sticky note thumbnail image is image data that indicates a thumbnail image of the sticky note. For example, the sticky note thumbnail image is created using a captured image data of the sticky note screen.

The user management table 121c stores information such as a user ID, a username, a notebook ID, an email address, a user type, an affiliated class, age, gender, and a location of each user (for example, the teacher, the student, etc.) who uses the information processing services provided by the information processing system 1. The data indicating the information stored in the user management table 121c is also referred to as user management data. When a new notebook is registered, a new line of user management data is added to the user management table 121c.

The user ID is unique identification information assigned to the user management data corresponding to each user. The user ID is the user identification information. The username is identification information that indicates the name of the registered user. The username is the identification information of the learner.

The notebook ID is identification information of the notebook corresponding to a lesson taken by the registered user. The notebook ID in the user management table 121c corresponds to the notebook ID contained in the notebook management data stored in the notebook management table 121a. The email address is information of the email address used by the registered user. The user type, affiliated class, age, gender, and location are attribute information corresponding to each user. Among these, the user type is the attribute information corresponding to the user's status and ability such as a student or a teacher, or an organization, a department, or a field of expertise where the user belongs. The affiliated class is information that is set when the user type is student and related to the class where the user belongs (for example, class A of 1st grade, etc.). The location may be any positional information that can be set for each user, such as the name of the country, name of the region, postal code, other address code, or street address that indicates at least one of the address, the residence, and the current location of the user and the address and the residence of the organization where the user belongs.

The submission location management table 121d is a table that manages information related to the submission location of the assignment created by the user in the learning support application.

The submission location management table 121d stores information such as the submission location ID and the user ID for each submission location created by the user. The data indicating the information stored in the submission location management table 121d are also referred to as submission location management data. When a new submission location is created, a new line of submission location management data is added to the submission location management table 121d.

The submission location ID is unique identification information assigned to the submission location management data corresponding to each submission location. The user ID is the identification information of the user who has created the submission location.

[2. Description of Operation]
[2-1. Description of Example of Usage of Lesson Support Function]

Next, the lesson support functions of the information processing system 1 will be described.

The teacher (s) and student (s) can use this lesson support function during school lessons to share various types of information, such as assignments for correction in the lessons.

FIG. 3 is a flowchart illustrating an example of usage of the lesson support function.

First, the controller 21A of the first terminal device 20A executes the learning support application for teachers such that the user (in this case, the teacher) inputs the user ID to log in to the device, selects the subject for which the user creates the assignment, and creates a notebook (Step A1).

Figure 4A:
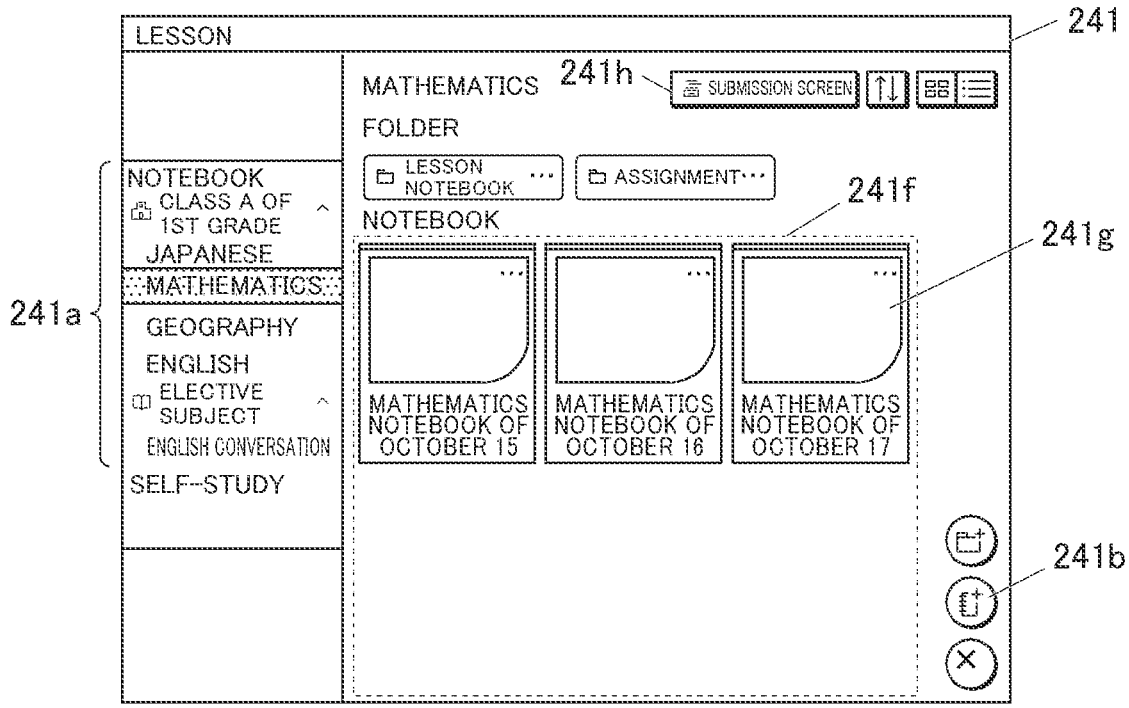
FIG. 4A is a diagram illustrating an example of a lesson screen according to the first embodiment.

Specifically, the controller 21A causes the display 24A to display the lesson screen 241 illustrated in FIG. 4A and allows the teacher to perform an input operation. For example, the teacher creates notebooks for lessons of respective days, as illustrated in FIG. 4A.

The controller 21A allows the teacher to select a subject for which an assignment is to be made from the subject list 241a in the lesson screen 241. In the example illustrated in FIG. 4A, "Mathematics" is selected.

Next, the controller 21A allows the teacher to press a "Create New Notebook" button 241b in the lesson screen 241.

Figure 4B:
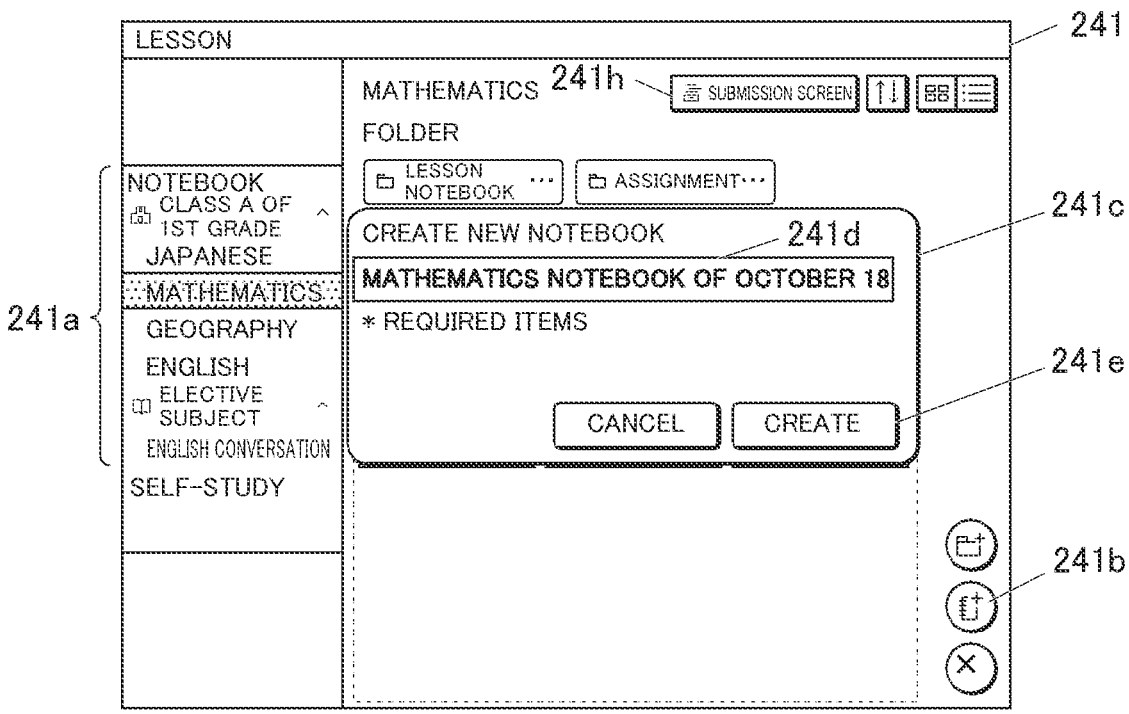
FIG. 4B is a diagram illustrating an example of a new notebook creation screen according to the first embodiment.

In response to the pressing operation of the "Create New Notebook" button 241b by the teacher, the controller 21A causes the display 24A to display a new notebook creation screen 241c in the lesson screen 241 as illustrated in FIG. 4B.

Then, the controller 21A receives input of the notebook name (for example, "Mathematics Notebook dated October 18") in the input field 241d in the new notebook creation screen 241c and a pressing operation of a "Create" button 241e.

When the controller 11 of the server device 10 receives a control signal from the first terminal device 20A based on the input in the input field 241d and the pressing operation of the "Create" button 241e by the teacher, the controller 11 adds one new line of the notebook management data to the notebook management table 121a (Step B1).

Figure 4C:
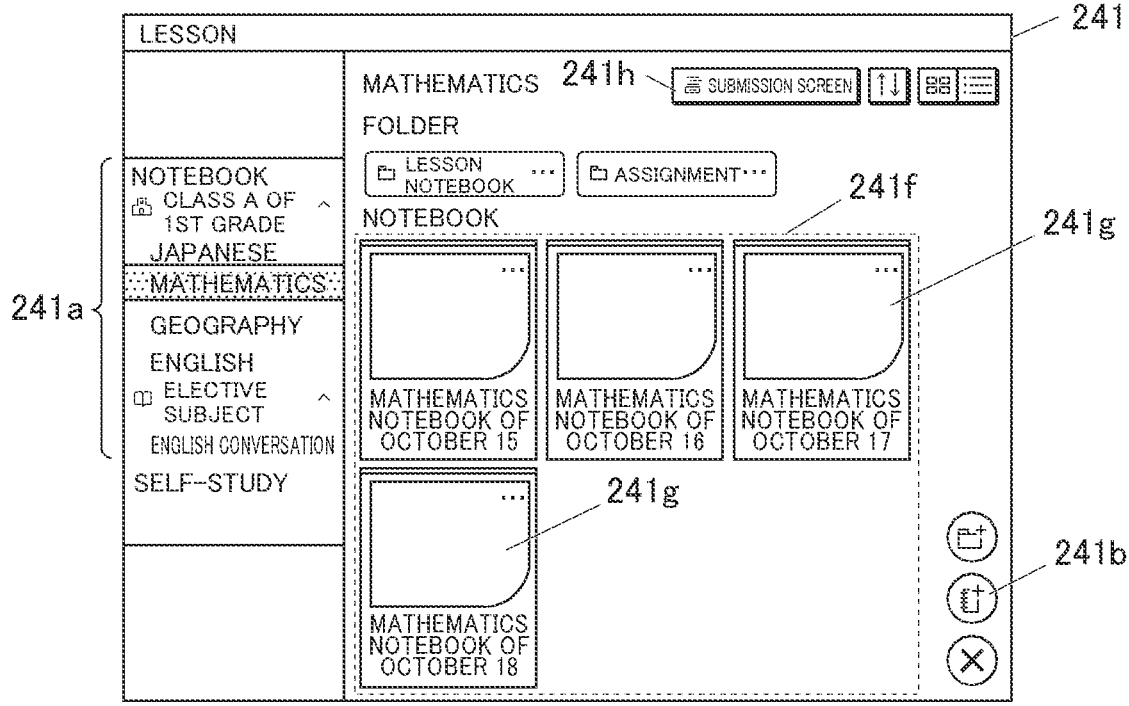
FIG. 4C is a diagram illustrating an example of a lesson screen according to the first embodiment.

In response to the pressing operation of the "Create" button 241e, the controller 21A displays a notebook thumbnail image 241g of the created notebook in the notebook display area 241f in the lesson screen 241 as illustrated in FIG. 4C. Each notebook thumbnail image 241g may include the name of the notebook, the username of the user who has created the notebook, and the date and time of the update.

When a selection operation of the notebook thumbnail image 241g by the teacher in the notebook display area 241f is received, the controller 21A causes the display 24A to display the notebook screen 242 (FIG. 5A) of the selected notebook. The teacher creates an assignment on the notebook screen 242.

Next, the controller 21A receives creation of a submission location ("submission destination") of the assignment (Step A2). Specifically, in response to a pressing operation of a "Submission Screen" moving button 241h in the lesson screen 241 (FIG. 4A) or a "Submit" button 242a in the notebook screen 242 (FIG. 5A) by the teacher, the controller 21A causes the display 24A to display an assignment management screen 243 illustrated in FIG. 6A.

In response to a pressing operation of a "Create Submission Destination" button 243a in the assignment management screen 243 by the teacher, the controller 21A causes the display 24A to display a new submission destination creation screen 243c in the assignment management screen 243 illustrated in FIG. 6B.

Then, the controller 21A receives input of the name of the submission destination (for example, "Assignment 002") and a deadline (date and time) in the input field 243d in the new submission destination creation screen 243c by the teacher and a pressing operation of a "Create" button 243e.

When the controller 11 of the server device 10 receives a control signal from the first terminal device 20A based on the input to the input field 243d and the pressing operation of the "Create" button 243e by the teacher, the controller 11 adds a new line of submission location management data to the submission location management table 121d (Step B2).

In response to the pressing operation of the "Create" button 243e, the controller 21A causes the display 24A to display the submission destination of the created assignment in the submission destination list 243b in the assignment management screen 243.

Next, the controller 21A allows the teacher to create an assignment using a sticky note (Step A3). Specifically, in response to a pressing operation of a "Text" sticky note button 242b in the notebook screen 242 (FIG. 5A) by the teacher, the controller 21A causes the display 24A to display a sticky note edit screen 244 illustrated in FIG. 7.

The controller 21A allows the teacher to perform a pressing operation of a text input button 244a in the sticky note edit screen 244 to receive input of the content of the assignment with text in an input area 244b.

In response to a pressing operation of a stamp input button 244c by the teacher, the controller 21A causes the display 24A to place a stamp in the input area 244b. In response to a pressing operation of a handwriting input button 244d by the teacher, the controller 21A receives handwriting input in the input area 244b. In response to a pressing operation of a sound input button 244e by the teacher, the controller 21A allows sound data to be added to the sticky note.

Then, in response to a control signal received from the first terminal device 20A based on a pressing operation of a "Save" button 244f by the teacher, the controller 11 of the server device 10 adds one new line of the sticky note management data to the sticky note management table 121b (Step B3).

In response to a pressing operation of the "Store" button 244f, the controller 21A causes the display 24A to display the sticky note created in a sticky note display area 242c (FIG. 5B) in the notebook screen 242. In the example illustrated in FIG. 5B, the display 24A displays a sticky note 2421 created in the notebook screen 242 of the "Mathematics Notebook on October 18".

In response to a pressing operation of a "Camera" sticky note button 242d in the notebook screen 242 by the teacher, the controller 21A allows creation of a sticky note that is a still image or moving image captured by the image capturing unit 27A.

In response to a pressing operation of a "Link" sticky note button 242e by the teacher, the controller 21A allows creation of a sticky note with a linked URL (Uniform Resource Locator) on the Web.

In response to a pressing operation of a "File" sticky note button 242f by the teacher, the controller 21A allows creation of a sticky note that is a file (for example, a file of a still image, a moving image, or a PDF (Portable Document Format)) stored in the storage 22A.

In response to a pressing operation of a "Dictionary" sticky note button 242g by the teacher, the controller 21A allows creation of a sticky note that is a content (a word, a phrase, an example sentence, and the like) looked up with a dictionary tool.

Figure 8A:
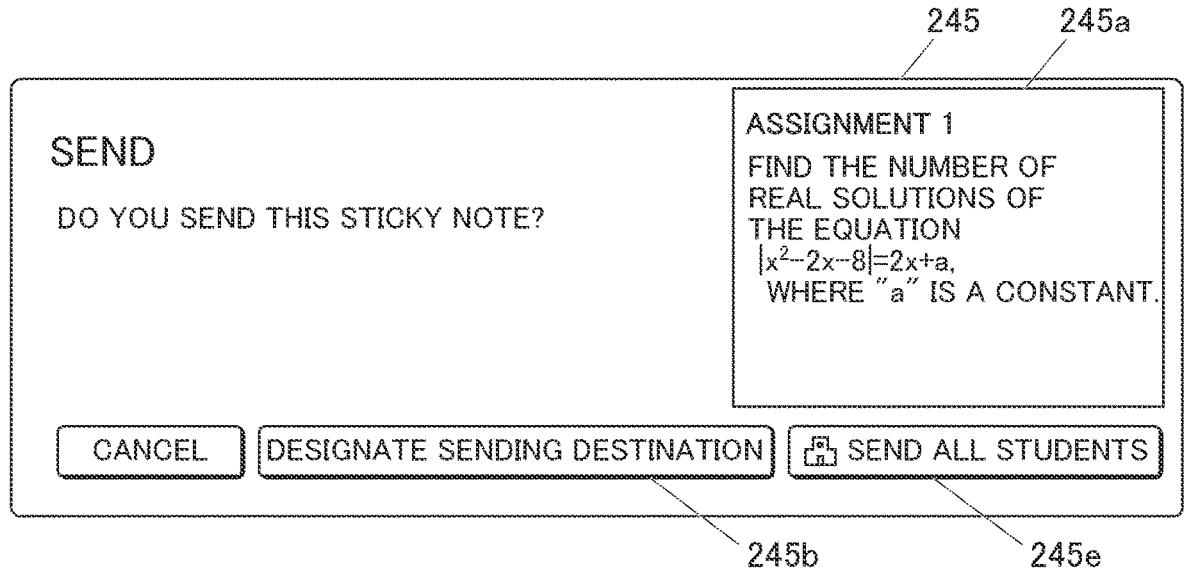
FIG. 8A is a diagram illustrating an example of a sending screen according to the first embodiment; according to the first embodiment.

Next, the controller 21A causes the sticky note of the assignment to be sent to the student (s) (Step A4). Specifically, in response to a drag-and-drop operation of the sticky note 2421 onto a "Send/Receive" button 242h (FIG. 5B) in the notebook screen 242 by the teacher, the controller 21A causes the display 24A to display a sending screen 245 illustrated in FIG. 8A. As illustrated in FIG. 8A, a sticky note thumbnail image 245a of the sticky note to be sent is displayed in the sending screen 245.

In response to a pressing operation of a "Designate Sending Destination" button 245b in the sending screen 245, the controller 21A allows the teacher to designate a sending destination.

Figure 8B:
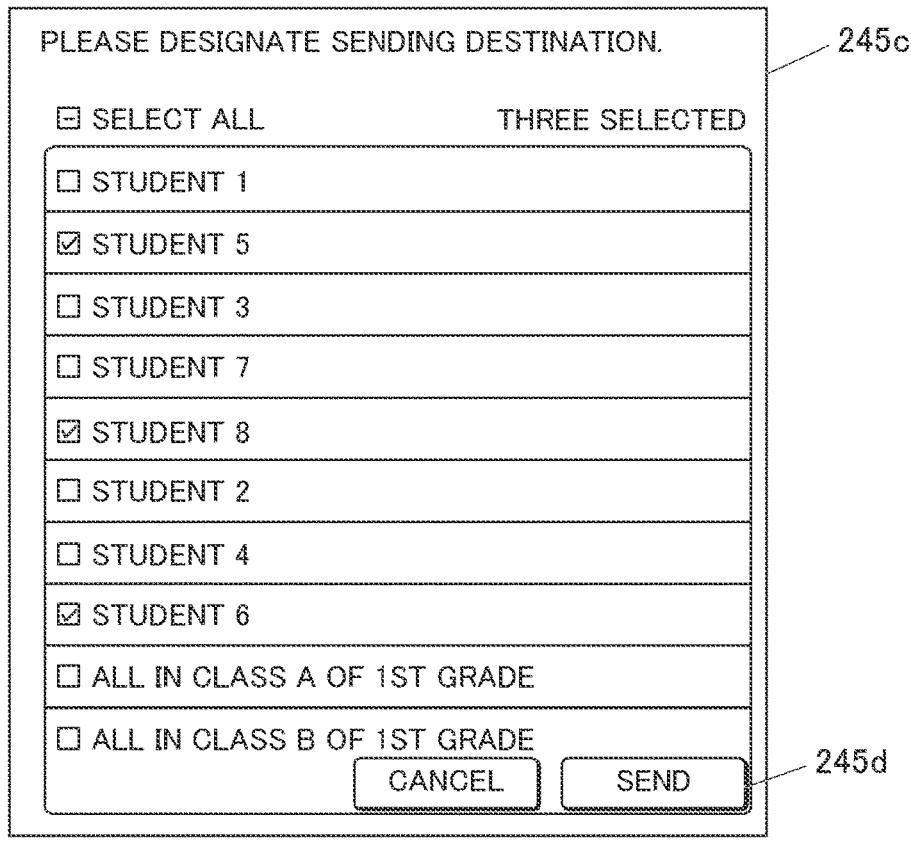
FIG. 8B is a diagram illustrating an example of a sending destination selection screen according to the first embodiment.

In response to a pressing operation of the "Designate Sending Destination" button by the teacher, the controller 21A causes the display 24A to display a sending destination selection screen 245c illustrated in FIG. 8B.

The controller 21A causes the display 24A to display, in the sending destination selection screen 245c, a check box for selection of all the students taking the lesson related to the sticky note to be sent ("Select All"), check boxes for selection of respective students taking the lesson one by one, and check boxes for selection of respective classes where the students take the lesson. It is possible to display the check boxes for selection of students by class as the sending destination due to the information on the affiliated class for each student registered in the user management table 121c as described above.

The controller 21A allows the teacher to select the sending destination and to press the "Send" button 245d.

In response to a pressing operation of a "Send All Students" button 245e in the sending screen 245, the controller 21A may allow the teacher to send the sticky note to all the students taking the lesson (for example, all the students in class A and class B of 1st grade).

When the controller 11 of the server device 10 receives a control signal from the first terminal device 20A based on the pressing operation of the "Send" button 245d or the "Send All Students" button 245e by the teacher, the controller 11 causes the sticky note to be sent to the sending destination having selected in the sending destination selection screen 245c or to the second terminal devices 20B used by all the students taking the lesson (Step B4).

In other words, the controller 11 of the server device 10 receives instructions from the first terminal device 20A to send the sticky note (information data related to learning) to the student (s) (learner (s)) by class to which the students belong, to the individually designated learners, or to all the learners. The controller 11 of the server device 10 uses the above-described user identification information (user IDs) corresponding to the respective students to designate the students (learners), who are acquirers of the sticky note (information data related to learning).

Here, the controller 11 of the server device 10 may cause notification that the sticky note has been sent to be sent to the sending destination(s) that has been selected on the sending destination selection screen 245c or to the second terminal device (s) 20B used by all the students taking the lesson.

Next, the controller 21B of the second terminal device 20B executes the learning support application for students in the same manner as in Step A1, such that the user (in this case, the student) inputs the user ID to log in to the device, selects the subject for receiving the assignment, and creates a notebook (Step C1).

Next, in response to a pressing operation of the "Submission Screen" moving button 241h in the lesson screen 241 (FIG. 4A) or the "Submission" button 242a in the notebook screen 242 (FIG. 5A) by the student, the controller 21A causes the display 24B to display the assignment management screen 243 (FIG. 6A) (Step C2). The student checks the submission location (submission destination) of the assignment in the assignment management screen 243.

Figure 9:
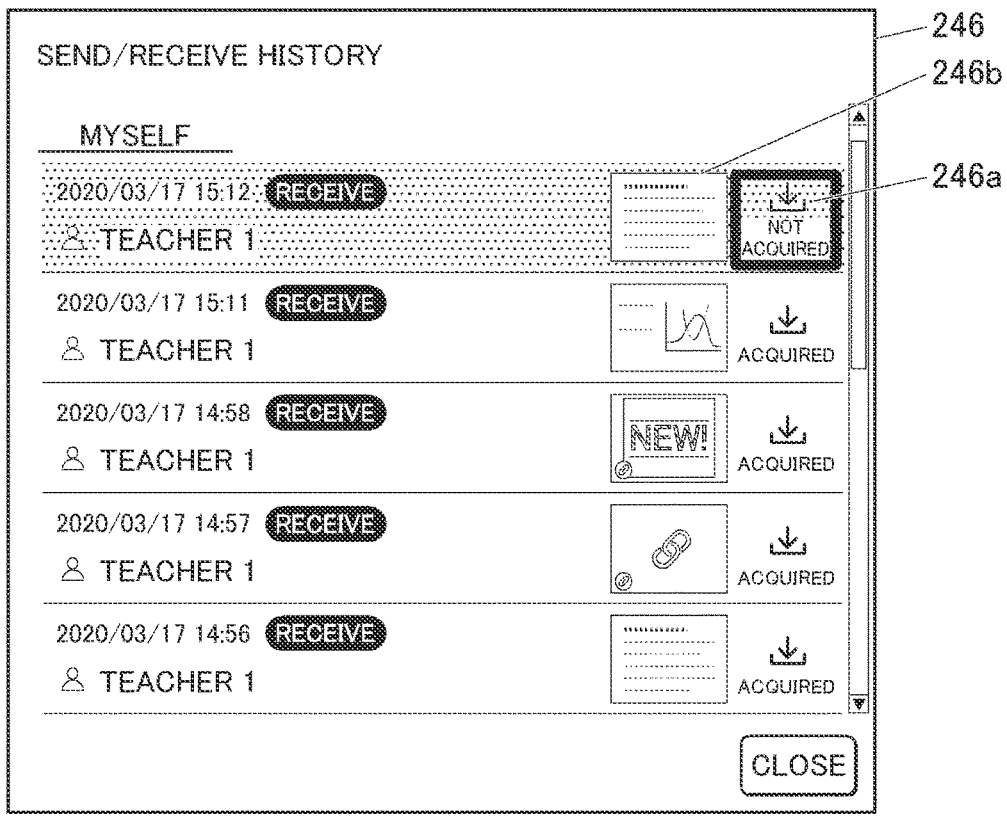
FIG. 9 is a diagram illustrating an example of a send/receive history screen for students according to the first embodiment.

Next, the controller 21B downloads the sticky note of the assignment that has been sent by the teacher (Step C3). Specifically, in response to a pressing operation of the "Send/Receive" button 242h (FIG. 5A) in the notebook screen 242 by the student, the controller 21B causes the display 24B to display a send/receive history screen 246 for students illustrated in FIG. 9.

In response to the pressing operation of a "Download" button 246a in the send/receive history screen 246 by the student, the controller 21B downloads the sticky note sent by the teacher. In the send/receive history screen 246, a sticky note thumbnail image 246b corresponding to each sticky note, the date and time of receipt of the sticky note, and the username of the sender of the sticky note (for example, Teacher 1) are displayed.

When the student has downloaded the sticky note, the controller 11 of the server device 10 acquires acquired information indicating that the student has already acquired the sticky note (Step B5). In other words, the controller 11 of the server device 10 acquires the acquired information indicating that the student (learner) who is the designated acquirer (sending destination) of the sticky note has acquired the sticky note (information data related to learning) from the first terminal device 20A via the second terminal device 20B.

In addition to the acquired information described above, when the student has viewed the downloaded sticky note, the controller 11 of the server device 10 may acquire information indicating that the student has viewed the downloaded sticky note.

Then, the controller 21B causes the display 24B to display the downloaded sticky note in the sticky note display area 242c in the notebook screen 242.

Next, the controller 21B allows the student to input an answer to the assignment in the sticky note (Step C4).

Then, the controller 21B causes the sticky note in which the student has input the answer to be submitted to the submission destination of the assignment (Step C5).

The controller 11 of the server device 10 allows the sticky note to be submitted from the second terminal device 20B (Step B6).

Next, the controller 21A of the first terminal device 20A displays the sticky note including the answer submitted by the student in the submission destination of the assignment display (Step A5).

Then, the controller 21A allows the teacher to correct the sticky note including the answer submitted by the student (Step A6).

Then, the controller 21A allows the teacher to return the corrected sticky note to the student (Step A7).

The controller 11 of the server device 10 allows the sticky note to be returned from the first terminal device 20A (Step B7).

Here, the controller 11 of the server device 10 may notify the second terminal device 20B used by the student that is the return destination of the sticky note that the sticky note has been returned.

Next, the controller 21B of the second terminal device 20B downloads the corrected sticky note sent by the teacher in the same manner as in Step C3 (Step C6).

Thus, an example of the flow of using the lesson support function of the information processing system 1 has been described.

[2-2. Description of Display in Send/Receive History Screen for Teachers]

Next, the display in the send/receive history screen 247 for teachers illustrated in FIG. 10A will be described.

The teacher can, for example, check the send/receive history screen 247 after Step A4 of the above example of using the lesson support function so as to know whether or not the sticky note of the assignment sent to the student has been downloaded (already acquired) by the student.

Figure 10A:
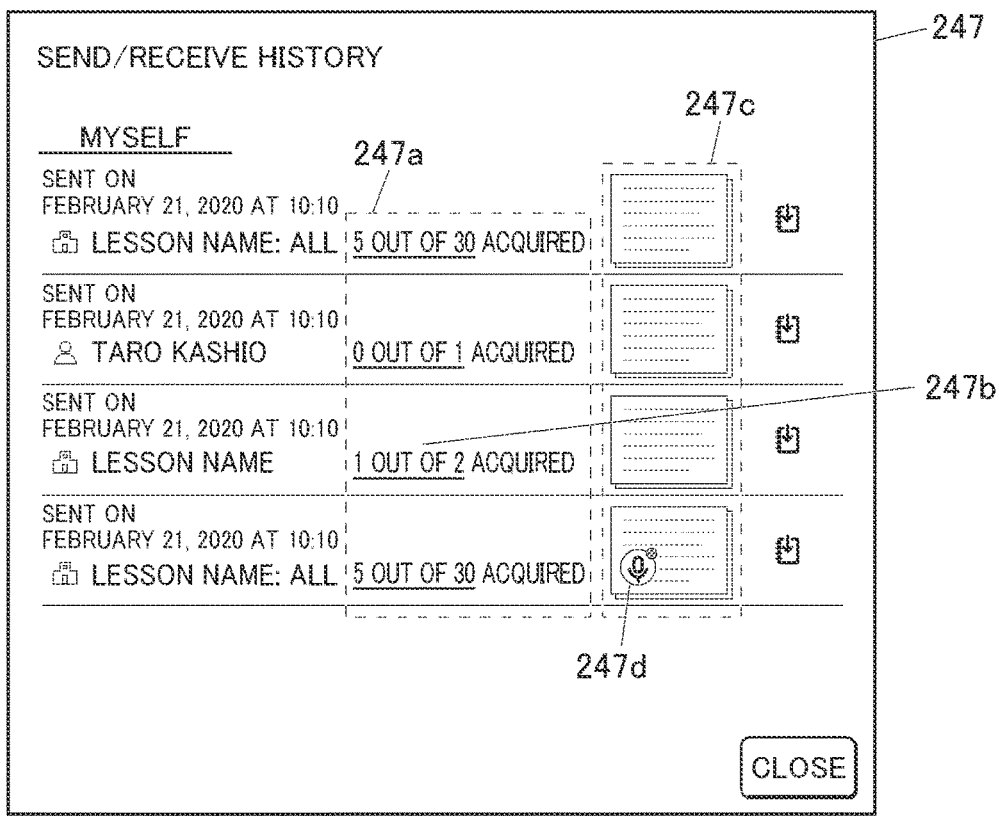
FIG. 10A is a diagram illustrating an example of a send/receive history screen for teachers according to the first embodiment.

Specifically, in response to the pressing operation of the "Send/Receive" button 242h (FIG. 5B) in the notebook screen 242 by the user (in this case, the teacher), the controller 21A of the first terminal device 20A causes the display 24A to display the send/receive history screen 247 for teachers illustrated in FIG. 10A.

As illustrated in FIG. 10A, the controller 11 of the server device 10 sends a control signal to the first terminal device 20A based on the acquired information for each sticky note that has been sent, in order that acquisition status information that associates the acquired status 247a with the sticky note thumbnail image 247c of the sticky note is displayed on the send/receive history screen 247 for teachers.

In other words, the controller 11 causes the display 24A to display acquisition status information for each of the multiple sticky notes (information data related to learning).

The acquired status 247a shows the number of the sending destinations of the sticky note who have already downloaded the sticky note. For example, "½ people acquired" means that there are two sending destinations of the sticky note and that one of them has already downloaded the sticky note.

In other words, based on the acquired information, the controller 11 provides the acquisition status information by associating the number of students (learners) designated as the acquirers (sending destinations) who acquire the sticky note (information data related to learning), the number of students who have already acquired the sticky note or who have not acquired the sticky note, and the thumbnail image of the sticky note.

The controller 11 also causes the display 24A of the first terminal device 20A to display the associated acquisition status information.

In response to the selection of a thumbnail image of a sticky note displayed on the send/receive history screen 247 for teachers, the controller 11 may cause the display 24A to display details of the sticky note of the assignment corresponding to the thumbnail image.

When the sticky note that has been sent includes the sound data, the controller 11 causes a sound mark 247d (sound identification information) to be displayed on the sticky note thumbnail image 247c.

On the send/receive history screen 247, the time and date of sending of each sticky note and the sending destination of the sticky note (for example, "Lesson Name" "All") are displayed.

Figure 10B:
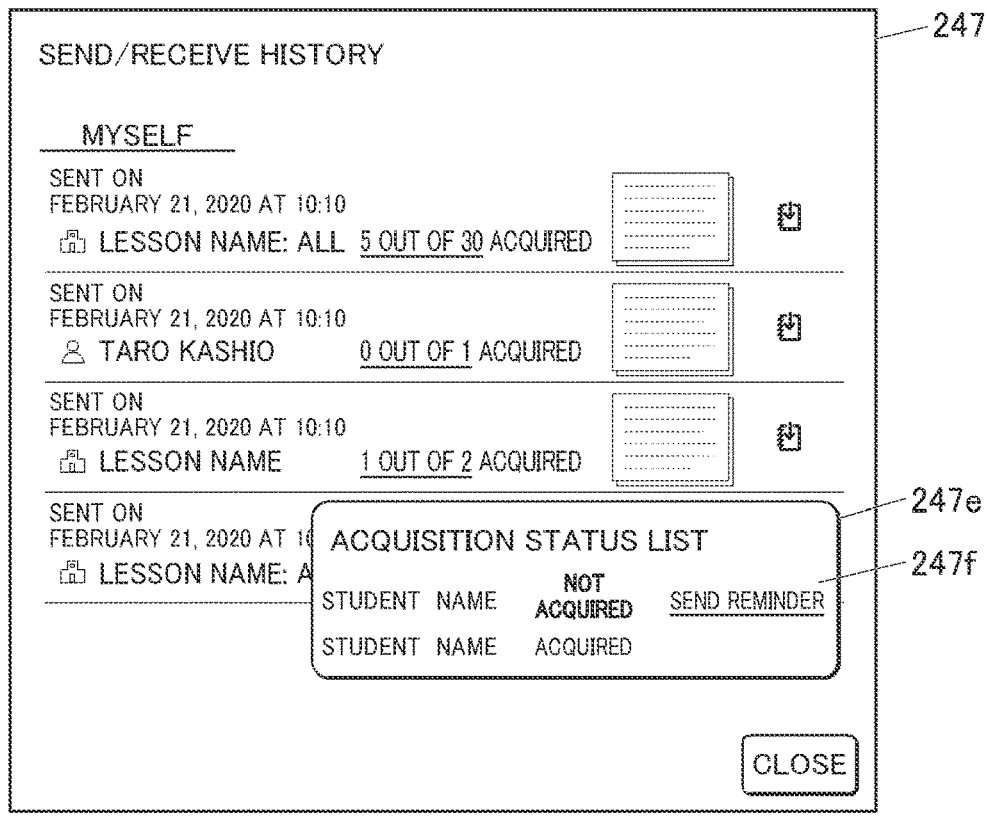
FIG. 10B is a diagram illustrating an example of a send/receive history screen for teachers according to the first embodiment.
Figure 10C:
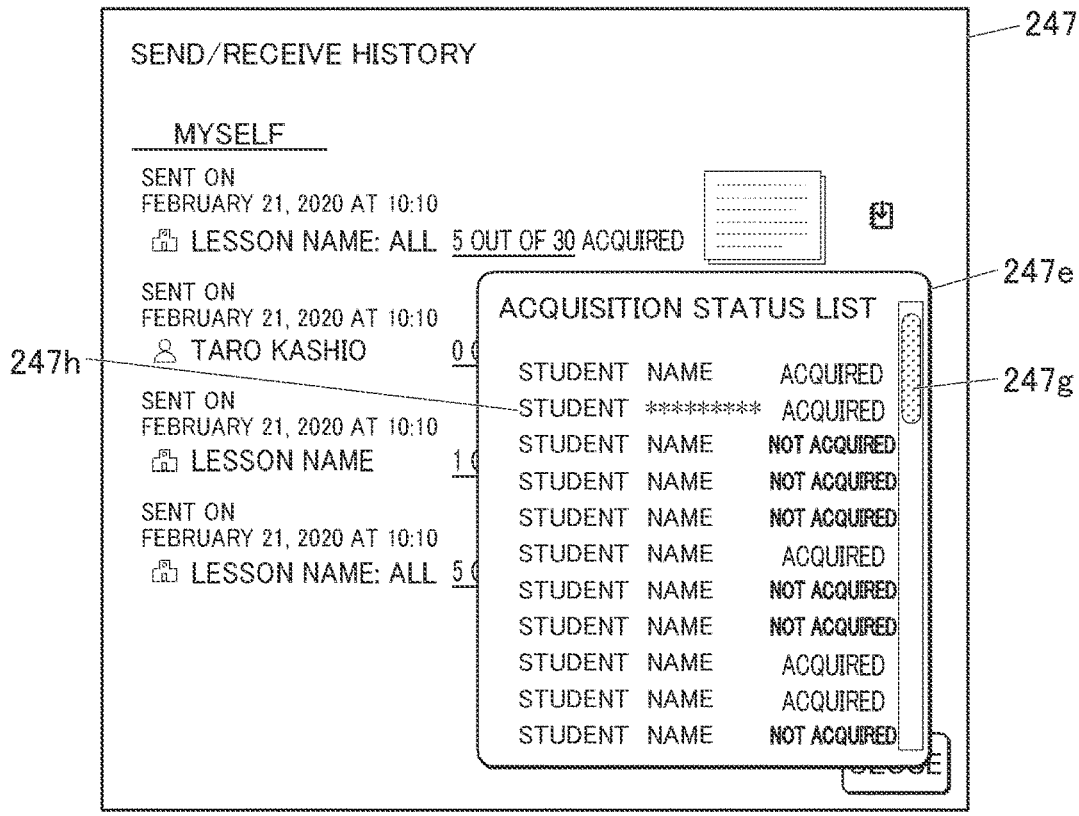
FIG. 10C is a diagram illustrating an example of a send/receive history screen for teachers according to the first embodiment.

When the controller 11 receives a control signal from the first terminal device 20A based on the pressing operation of the "Acquired Number" button 247b in the send/receive history screen 247 by the user (in this case, the teacher), the controller 11 sends a control signal to the first terminal device 20A such that the acquisition status list 247e illustrated in FIG. 10B and FIG. 10C are displayed on the send/receive history screen 247.

In the acquisition status list 247e, the controller 11 causes the display 24A to display a list showing the usernames (identification information of the learners) of the users (in this case, the students) as the sending destinations and the acquisition status ("Acquired" or "Not Acquired") of each of the users.

When the acquired status 247a is "1 out of 2 acquired", the acquisition status list 247e illustrated in FIG. 10B is displayed.

The controller 11 may cause the display 24A to display a "Send Reminder" button 247f for the user whose acquisition status is "Not Acquired" as illustrated in FIG. 10B.

In response to a control signal from the first terminal device 20A based on the pressing operation of the "Send Reminder" button 247f by the user (in this case, the teacher), the controller 11 sends a reminder to the second terminal device 20B used by the user (in this case, the student) whose acquisition status is "Not Acquired" to instruct the user to download the sticky note that has been sent. In other words, the controller 11 sends notification that instructs the student (learner) who has not acquired the sticky note (information data related to learning) to acquire the sticky note. When acquisition statuses of multiple students are "Not Acquired" as illustrated in FIG. 10C, a "Send Batch Reminders" button (not shown in the drawings) may be displayed that enables reminders to be sent to all students who have not yet acquired the sticky note.

When the acquired status 247a is "5 out of 30 acquired", the acquisition status list 247e illustrated in FIG. 10C is displayed. The acquired status 247A is not limited to the above-described display of "5 out of 30 acquired" but may be displayed differently. For example, "5 out of 30 acquired" may be replaced by "25 out of 30 not acquired". In other words, the acquired status 247A only needs to be displayed such that the number of people to whom the sticky note has been sent and the number of people who have acquired or have not acquired the sticky note can be read.

When there are too many sending destinations to be displayed in the acquisition status list 247e all at once, the displayed sending destinations may be changed in accordance with a movement of a scroll bar 247g as illustrated in FIG. 10C.

When the username of a sending destination is too long to be displayed in the acquisition status list 247e, the username may be displayed as an abbreviation 247h as illustrated in FIG. 10C.

The users displayed in the acquisition status list 247e may be sorted based on the acquisition status such that the users who are not yet acquired the sticky note are displayed together (for example, at the top of the list).

The teacher can grasp the number of the students who have already downloaded the sticky note for each assignment by checking the acquired status 247a and the sticky note thumbnail image 247c. In more detail, even when the text in the sticky note thumbnail image 247c is too small to be read, the teacher can grasp the assignment corresponding to the sticky note thumbnail image 247c from the information that can be read from the sticky note thumbnail image 247c (for example, amount of text, size and position of text, and shape of graph or graphic if any). As a result, the teacher can grasp the number of the students who have already downloaded the sticky note for each assignment.

The teacher can also grasp which students have already downloaded the sticky note and which students have not downloaded the sticky note by checking the acquisition status list 247e.

Second Embodiment

Next, the second embodiment of the present disclosure will be described. In the following, the second embodiment will be described focusing mainly on the points where it differs from the first embodiment.

The storage 12 of the server device 10 in the second embodiment stores absence information. The absence information indicates which students are absent from which lessons. For example, the stored absence information includes the user ID of the student (absentee) who is absent from a lesson in association with the notebook ID of the lesson.

For example, the server device 10 acquires, during the lesson, the user ID of the student who has not logged on to the second terminal device 20B among the students who are taking the lesson as the user ID of the absentee. The server device 10 stores the user ID of the absentee associated with the notebook ID corresponding to the lesson as the absence information.

The absence information may be input by the teacher via the operation receiver 23A of the first terminal device 20A to be sent to the server device 10 via the communication interface 25A. The server device 10 may also acquire the absence information from an external device other than the first terminal device 20A or the second terminal device 20B. In other words, the controller 11 acquires absence information about the learner's absence from the lesson.

Figure 11A:
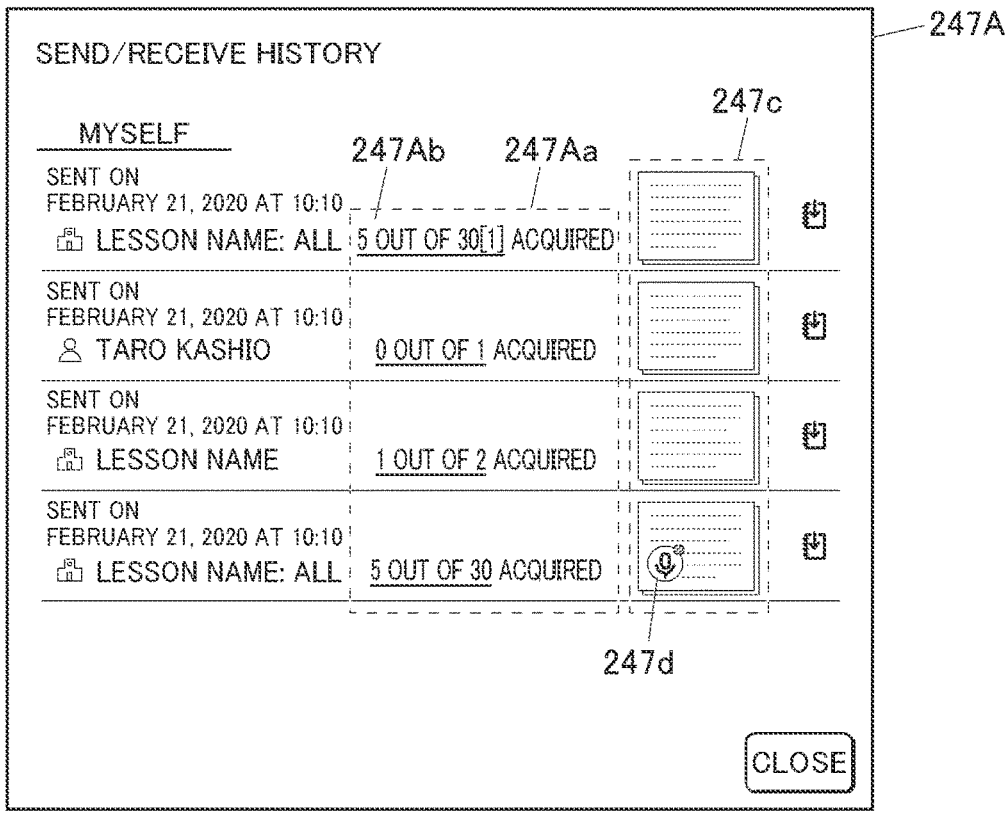
FIG. 11A is a diagram illustrating an example of a send/receive history screen for teachers according to a second embodiment.

Next, the display in the send/receive history screen 247A for teachers (FIG. 11A) in the second embodiment will be described.

In the acquired status 247Aa in the second embodiment, the controller 11 causes the display 24A to display, based on the absence information, the number of the absentees in addition to the number of the sticky note sending destinations that have already downloaded the sticky note.

In other words, based on the acquired absence information, the controller 11 causes the display 24A to display, as the acquisition status information, the number of learners who are designated as the acquirers (sending destinations) of the sticky note (information data related to study) related to the lesson and who are absent from the lesson. For example, "5 out of 30 [1] acquired" means that there are 30 sending destinations of the sticky note, five of them have already downloaded the sticky note, and one of them is absent from the lesson.

The number of the sending destinations of the sticky note in the acquired status 247Aa may be set in advance whether or not to include the number of the absentee.

That is, when the number of the sending destinations of the sticky note does not include the number of absentees, for example, "5 out of 29 [1] people have acquired" is displayed as the acquired status 247Aa. This means that the number of absentees from the lesson is one, the number of sending destinations of the sticky note is 29, and five of them have already downloaded the sticky note. The number of absentees may be displayed as "5 out of 29 (1) people have already downloaded". The character (s) indicating the number of absentees ([1]) may be different in font, size, or color from the other character (s).

Figure 11B:
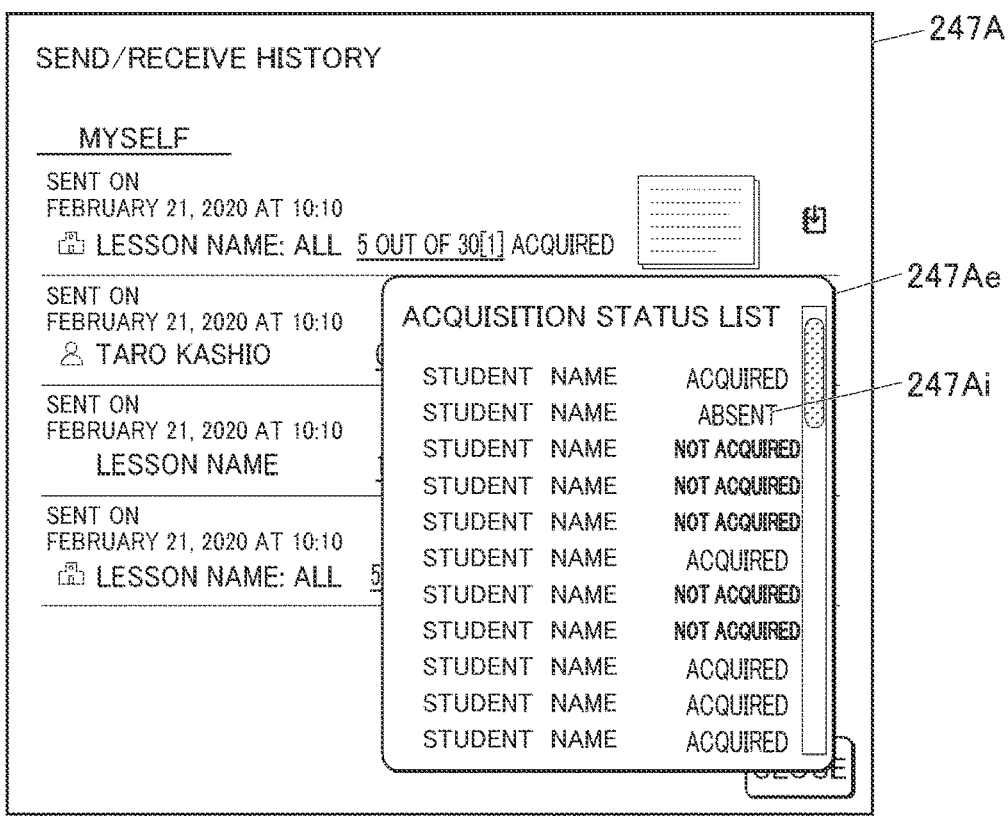
FIG. 11B is a diagram illustrating an example of a send/receive history screen for teachers according to the second embodiment.

In response to a control signal from the first terminal device 20A based on a pressing operation of an "Acquired Number" button 247Ab in the send/receive history screen 247A by the user (in this case, the teacher), the controller 11 sends a control signal to the first terminal device 20A so that an acquisition status list 247Ae illustrated in FIG. 11B is displayed in the send/receive history screen 247A.

In the acquisition status list 247Ae, the controller 11 causes the display 24A to display a list showing the usernames and the acquisition statuses ("Acquired" or "Not Acquired") of each of the users (in this case, the students) designated as the sending destinations. In the acquisition status list 247Ae, the controller 11 also causes the display 24A to display the username of the absentee and information 247Ai indicating that the user is the absentee (for example, "Absent").

The teacher can grasp the number of the students who have already downloaded the sticky note for each assignment by checking the acquired status 247Aa and the sticky note thumbnail image 247c. The teacher can also grasp the number of the students who have already downloaded the sticky note for each assignment from the information that can be read from the sticky note thumbnail image 247c (amount of text, size and position of text, and shape of graph or graphic if any). Furthermore, when there are absentee (s) from the lesson, the teacher can grasp the number of the absentee (s).

The teacher can also grasp which students have already downloaded the sticky note and which students have not downloaded the sticky note by checking the acquisition status list 247Ae. Furthermore, the teacher can grasp which students are absent from the lesson when there is any absentee from the lesson.

[Effects]

As described above, the information processing device (server device 10) according to the present embodiment is communicably connected to a first terminal device 20A used by a provider (teacher) and a second terminal device 20B used by a recipient (student) and includes a processor. The processor acquires acquired information indicating that an acquirer of information data (sticky note) has already acquired the information data (sticky note) via the second terminal device 20B. The acquirer is out of the recipient and is designated by the first terminal device 20A. The processor further provides acquisition status information by associating a number of the acquirer, a number of the recipient having acquired the information data or not having acquired the information data, and a thumbnail image of the information data based on the acquired information. The processor further causes a display 24A of the first terminal device 20A to display the acquisition status information.

Preferably, the provider is an educator, the recipient is a learner, and the information data is related to learning. As a result, the teacher can grasp the number of the students who have already downloaded the sticky note for each assignment. In other words, user convenience in sending and receiving data can be improved.

In the information processing device according to the present embodiment, the processor preferably causes the display 24A to display a list including identification information (username) of the acquirer and information indicating whether or not the acquirer has acquired the information data. As a result, the teacher can grasp which students have already downloaded the sticky note and which students have not downloaded the sticky note.

In the information processing device according to the present embodiment, the information data preferably include multiple pieces of information data, and the processor causes the display 24A to display the acquisition status information for each of the multiple pieces of information data. As a result, the teacher can grasp the acquisition status information of the multiple pieces of information data all at once.

In the information processing device according to the present embodiment, preferably, the processor acquires absence information about the absence of the learner from a lesson, and causes the display 24A to display the acquisition status information including a number of the learner who is the acquirer of the information data related to the lesson and who is absent from the lesson based on the absence information. As a result, when there are absentee (s) from the lesson, the teacher can grasp the number of the absentee (s).

In the information processing device according to the present embodiment, the processor preferably receives instructions to send the information data to the recipient by class to which the recipient belongs, to the recipient who is individually designated, or to all the recipient. As a result, the teacher can select the sending destination of the sticky note depending on the situation or depending on the teacher's request.

In the information processing device according to the present embodiment, upon the information data including sound data, the processor preferably causes the display 24A to display, on the sticky note thumbnail image, sound identification information (sound mark 247d) indicating that the information data include sound data. As a result, the user easily recognizes that the sticky note includes sound data.

In the information processing device according to the present embodiment, the processor preferably causes notification to be sent. The notification instructs the recipient who has not acquired the information data to acquire the information data. As a result, a reminder can be sent to a student who has not acquired the sticky note to instruct the student to acquire the sticky note.

Although some embodiments of the present disclosure have been described above, the scope of the present disclosure is not limited to the above-described embodiments, but includes the scope of disclosure described in the claims and its equivalent range.

For example, the information processing system is assumed to be used by teachers and students during lessons at schools or cram schools in the above embodiment, but is not limited to this. For example, the information processing system may be used by teachers and students during non-lesson time.

The above information processing system can also be used when the first terminal device 20A and the second terminal device 20B are, for example, personal computers that are not carried around but installed in the classroom.

In the above embodiment, the server device 10 functions as the information processing device, but it is not limited to this. The first terminal device 20A or other external devices may function as the information processing device.

When the first terminal device 20A functions as the information processing device, the controller 21A of the first terminal device 20A acquires the acquired information indicating that the learner designated as the acquirer of the information data related to learning has already acquired the information data related to learning via the second terminal device 20B. In other words, based on the acquired information, the controller 21A provides the acquisition status information by associating the number of learners designated as the acquirers of the information data related to learning, the number of learners who have already acquired the information data or who have not acquired the information data, and the thumbnail image of the information data related to learning. The controller 21A also causes the display 24A to display the associated acquisition status information.

In the above embodiment, an example in which the information processing system is used by an educator and a learner during a lesson at a school has been described, but is not limited to this. For example, the above information processing system may be used to deliver content such as entertainment. In this case, the information data is, for example, images, music, sports, or plays for entertainment, and the user of the first terminal device 20A (for example, an instructor) designates the recipient as the acquirer of the information to send the information data.

In this case, the processor of the server device 10 acquires the acquired information indicating that the recipient designated as the acquirer of the information data by the first terminal device 20A has already acquired the information data via the second terminal device 20B. Based on the acquired information, the processor associates the number of recipients designated as acquirers of the information data, the number of recipients who have already acquired the information data or the number of recipients who have not yet acquired the information data, and the thumbnail images of the information data to obtain the acquisition status information. The processor causes the display 24A of the first terminal device 20A to display the associated acquisition status information. As a result, the user of the first terminal device 20A can grasp the number of the recipients who have already downloaded each content. In other words, user convenience in sending and receiving the data can be improved.

The above description discloses an example using HDD or nonvolatile semiconductor memory as a computer-readable medium storing a program for executing each process, but the present disclosure is not limited to this example. As any other computer-readable medium, portable recording media such as CD-ROMs can also be applied. Carrier waves may also be applied as a medium for providing program data via communication lines.

The invention claimed is:

1. An information processing device that is communicably connected to a first terminal device used by an educator and a plurality of second terminal devices used by respective different learners, the information processing device comprising:
a communication interface through which the information processing device is communicably connected to the first terminal device and the second terminal devices via a network; and
a hardware processor configured to execute processes comprising:

acquiring first information indicating that information data has already been acquired by a user of one of the second terminal devices via the one of the second terminal devices, the user being one of a plurality of designated users designated by the first terminal device from among the respective different learners;

generating display data based on the acquired first information, the display data comprising acquisition status information in which (i) a number of the designated users, (ii) a number of the designated users having acquired the information data or not having acquired the information data, and (iii) a thumbnail image of the information data are associated with each other, and outputting the display data; and controlling a display of the first terminal device to display the acquisition status information thereon, based on the display data.

2. The information processing device according to claim 1, wherein the information data is related to learning.

3. The information processing device according to claim 2, wherein:
the processes further comprise acquiring absence information about absence of a learner from a lesson, and
the controlling comprises controlling the display to display, as a component of the acquisition status information, a number of at least one learner who has acquired the information data related to the lesson and is absent from the lesson, based on the absence information.

4. The information processing device according to claim 2, wherein the processes further comprise:
transmitting the information data to the one of the second terminal devices via the network; and
controlling a display of the one of the second terminal devices to display a notification indicating that the information data has not yet been acquired, until the information data is downloaded by the user of the one of the second terminal devices via the one of the second terminal devices.

5. The information processing device according to claim 1, wherein the controlling comprises controlling the display to display a list including identification information of the designated users and information indicating whether or not each designated users has acquired the information data.

6. The information processing device according to claim 1, wherein:
the information data include multiple pieces of information data, and
the controlling comprises controlling the display to display the acquisition status information for each of the multiple pieces of information data.

7. The information processing device according to claim 1, wherein the processes further comprise, in response to received instructions, performing control to send the information data to the user by a class where the user belongs, to at least one user who is individually designated from among the respective different learners, or to all of the respective different learners.

8. The information processing device according to claim 1, wherein:
the information data includes sound data, and
the controlling comprises controlling the display to display, on the thumbnail image, sound identification information indicating that the information data includes sound data.

9. The information processing device according to claim 1, wherein the processes further comprise controlling a notification to be sent that instructs a user from among the designated users who has not yet acquired the information data to acquire the information data.

10. The information processing device according to claim 1, wherein the acquiring acquires the first information from the one of the second terminal devices via the network in response to the information data being downloaded by the user of the one of the second terminal devices via the one of the second terminal devices.

11. A non-transitory computer-readable storage medium storing a program thereon, the program being executable by a computer of an information processing device that is communicably connected to a first terminal device used by an educator and a plurality of second terminal devices used by respective different learners, and the program being executable to control the computer to execute processes comprising:
acquiring first information indicating that information data has already been acquired by a user of one of the second terminal devices via the one of the second terminal devices, the user being one of a plurality of designated users designated by the first terminal device from among the respective different learners;
generating display data based on the acquired first information, the display data comprising acquisition status information in which (i) a number of the designated users, (ii) a number of the designated users having acquired the information data or not having acquired the information data, and (iii) a thumbnail image of the information data are associated with each other, and outputting the display data; and
controlling a display of the first terminal device to display the acquisition status information thereon, based on the display data.

12. An information processing system comprising:
an information processing device;
a first terminal device used by an educator and communicably connected to the information processing device via a network; and
a plurality of second terminal devices used by respective different learners and communicably connected to the information processing device via the network,
wherein the information processing device comprises a hardware processor configured to execute processes comprising:
acquiring first information indicating that information data has already been acquired by a user of one of the second terminal devices via the one of the second terminal devices, the user being one of a plurality of designated users designated by the first terminal device from among the respective different learners;
generating display data based on the acquired first information, the display data comprising acquisition status information in which (i) a number of the designated users, (ii) a number of the designated users having acquired the information data or not having acquired the information data, and (iii) a thumbnail image of the information data are associated with each other, and outputting the display data; and
controlling a display of the first terminal device to display the acquisition status information thereon, based on the display data.

* * * * *